United States Patent [19]

Bentham

[11] Patent Number: 4,550,000
[45] Date of Patent: Oct. 29, 1985

[54] APPARATUS FOR CONTACTING A LIQUID WITH A GAS

[75] Inventor: Jeremy B. Bentham, Amsterdam, Netherlands

[73] Assignee: Shell Oil Company, Houston, Tex.

[21] Appl. No.: 640,549

[22] Filed: Aug. 15, 1984

Related U.S. Application Data

[63] Continuation of Ser. No. 485,345, Apr. 15, 1983, abandoned.

[30] Foreign Application Priority Data

Apr. 15, 1982 [GB] United Kingdom ............... 8210980

[51] Int. Cl.⁴ .............................................. B01F 3/04
[52] U.S. Cl. .................................. 261/114 R; 202/158
[58] Field of Search ......... 261/114 R, 114 A, 114 JP, 261/114 VT, 114 TC; 202/158

[56] References Cited

U.S. PATENT DOCUMENTS

| Re. 27,908 | 1/1974 | Nutter et al. | 261/114 R |
| 545,392 | 8/1895 | Tracy | 261/114 R |
| 1,743,131 | 1/1930 | Grace | 261/114 A |
| 1,776,033 | 9/1930 | Kobernik | 261/114 A |
| 1,776,589 | 9/1930 | Keith, Jr. | 261/114 A |
| 2,391,464 | 12/1945 | Larsen | 261/114 A |
| 2,713,023 | 7/1955 | Irvine | 202/158 X |
| 2,787,453 | 4/1957 | Hibshman et al. | 261/114 JP |
| 2,846,204 | 8/1958 | Gilmore | 261/114 VT |
| 3,156,746 | 11/1964 | Kittel | 261/114 R |
| 3,589,689 | 10/1968 | English | 261/114 JP |
| 3,647,192 | 3/1972 | DeGroot et al. | 261/114 R |
| 3,937,769 | 2/1976 | Strigle, Jr. et al. | 261/114 R X |
| 3,985,625 | 10/1976 | Bjerg | 261/114 R X |
| 4,151,232 | 4/1979 | Slobodyanik | 261/114 R |
| 4,159,291 | 6/1979 | Bruckert et al. | 261/114 R |
| 4,179,487 | 12/1979 | Chekhov et al. | 261/114 R |
| 4,296,049 | 10/1981 | Ritter | 261/114 R X |
| 4,297,329 | 10/1981 | Sigmund et al. | 261/114 R X |

FOREIGN PATENT DOCUMENTS 1047749 12/1958 Fed. Rep. of Germany .
2011870 9/1971 Fed. Rep. of Germany .

Primary Examiner—Richard L. Chiesa

[57] ABSTRACT

A multi-tray apparatus for contacting a liquid with a gas is described, the apparatus being characterized by a perforated structure, located beneath downward flow means in the trays, for distributing downward flowing liquid uniformly over the trays.

3 Claims, 3 Drawing Figures

APPARATUS FOR CONTACTING A LIQUID WITH A GAS

This is a continuation of application Ser. No. 485,345, filed April 15, 1983, and now abandoned.

BACKGROUND OF THE INVENTION

The invention relates to an apparatus for contacting a liquid with a gas. More particularly, the present invention relates to an apparatus comprising a normally vertically extending column having a plurality of substantially horizontal trays arranged in the column one above the other, each of the trays being provided with apertures or openings for the passage of gas and with at least one means for downward transfer of liquid, the means for downward transfer of liquid providing liquid flow from the upper side of a given tray to a point below the tray, and the means for downward transfer of liquid comprising means for discharge of liquid. As used herein, the term "gas" is to be understood to include vapor.

Apparatuses of the above-mentioned type are employed in processes such as distillation, absorption and stripping. Examples of trays which may be utilized in such apparatuses are grid trays, which are formed of parallel bars that may be straight or curved and are spaced apart to leave slots between them; sieve plate trays, which are formed of plates that are punched or otherwise fabricated to have circular or other openings in them; and valve trays, which are sieve trays provided with valves being displaceably arranged in the openings of the trays.

The trays may be provided with a plurality of means for downward transfer of liquid, the means having any suitable shape. The longitudinal cross-section of such means is preferably oblong, since such a shape renders it possible to arrange the means in an optimal manner on a tray and insure during operation a uniform distribution of liquid over the tray and a uniform supply of liquid to the next lower tray. In the case where such apparatuses are intended for high liquid loads, the means for downward transfer of liquid occupy a considerable part of the tray area. The liquid discharge means or openings in the means for downward transfer of liquid may be arranged in the bottoms or side of the means or devices. When the trays are provided with a plurality of relatively closely packed devices for downward transfer of liquid, required for high liquid loads, it is advantageous to arrange the liquid discharge openings in the bottoms of the devices or to provide the devices with open lower ends. In this manner, interference of liquid streams from liquid discharge openings of adjacent devices is prevented.

When the liquid discharge openings are arranged in the bottoms of the devices, another problem may occur, especially when operating at high liquid loads. The liquid leaving the openings in the bottoms of the means or devices for downward transfer of liquid normally falls with such a velocity on to the next lower tray that the liquid may pass directly through the tray openings below the devices, in the case of sieve plate trays, or, if valve trays are used, may push the valves directly below the devices downwards, thereby closing the openings in the next lower tray. The consequence of such liquid flow is that the active tray area, i.e., the tray area not occupied by means or devices for downward transfer of liquid, is not fully used for the passage of gas. The gas is not, therefore, uniformly distributed over the whole active tray area, and, as a consequence thereof, the space above a tray is not optimally employed for contact between gas and liquid. It is an object of the invention to provide a tray apparatus for contacting a liquid with a gas, the apparatus having active tray areas which can be optimally used for gas/liquid contact, even when the apparatus is operated at high liquid loads.

SUMMARY OF THE INVENTION

Accordingly, the invention relates to an apparatus for contacting a liquid with a gas, the apparatus comprising a normally vertically extending column having at least one inlet and outlet and a plurality of internal substantially horizontal trays spaced from each other and arranged in the column one above the other, each of said trays being provided with apertures for the passage of gas and with at least one means for downward transfer of liquid, said means for downward transfer of liquid providing liquid flow from the upper side of a tray to a point below the tray, the means for downward transfer of liquid comprising means for discharge of liquid; and means for distributing the flow of liquid from at least the majority of said means for discharge of liquid over the respective trays beneath said means for discharge, said means for distributing the flow of liquid being positioned beneath the respective means for discharge, but spaced above the tray beneath said means for discharge, each said means for distributing the flow of liquid comprising a perforated structure having a plurality of apertures over the greater portion thereof. As will be appreciated by those skilled in the art, the means for distributing liquid need not be positioned below the bottom tray in the column.

In a suitable embodiment of the invention, the perforated structure is formed of expanded metal, e.g., sheet metal cut and stretched into a lattice. The expanded metal may have tangential diamond-shaped openings, arranged in zigzag order. Both the area of the openings, based on the surface area of the sheet metal, and the position of the openings, can be varied in a wide range. An advantage of using expanded metal is that it can be easily bent to the desired shape.

By the arrangement of a perforated structure between a liquid discharge means on a tray and the next lower tray, a liquid stream from the means for liquid discharge is broken up and at least partly deflected. The deflection of the liquid stream promotes a uniform distribution of liquid on a tray. By breaking the liquid stream, the flow velocity of liquid and the resulting impact of the liquid on a tray is reduced. As a consequence thereof, the apertures in a given tray for the passage of gas are less hampered by liquid coming from a discharge means of the next upper tray when compared with the hindrance of the passage of gas by the liquid when a perforated structure is not arranged between a discharge means on a tray and a next lower tray.

DETAILED DESCRIPTION OF THE INVENTION

The invention will now be described with reference to the accompanying drawing.

Figure 1:
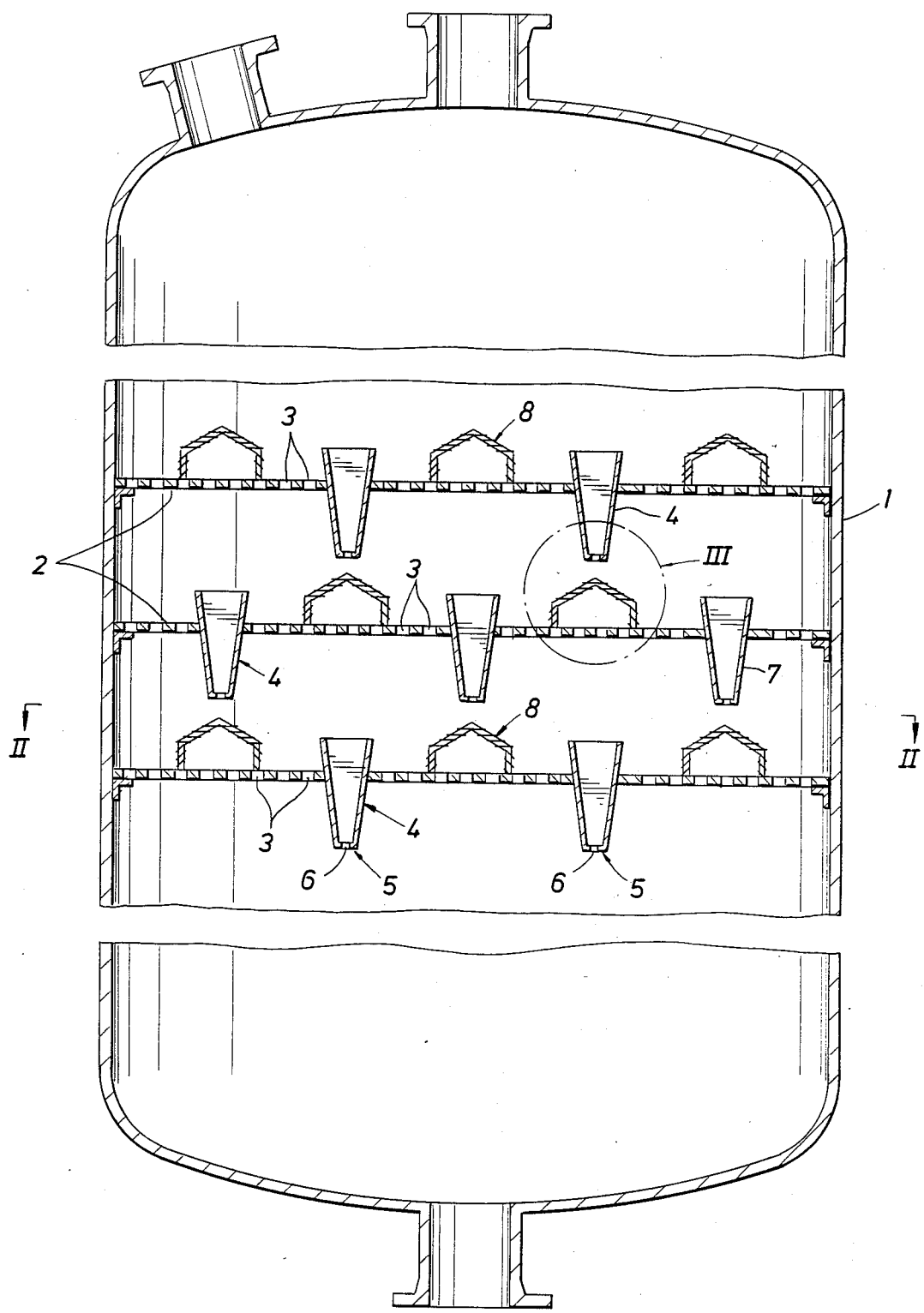
FIG. 1 is a vertical sectional view of an intermediate section (and top and bottom closure) of a gas/liquid contacting column according to the invention.

In FIG. 1, there is shown an intermediate part (1) of a vertically arranged column of circular cross-section (shown in FIG. 2), which column is provided at its top and bottom with inlets and outlets for liquid and gas, as appropriate and, if desired, with a liquid distributor, a condenser, a reboiler (not shown) and/or other associated devices in known manner, for causing gas to ascend, and liquid to descend, through the column.

The interior of the column is provided with a plurality of horizontal contacting trays (2) (only three of which are shown), arranged one above the other at suitable intervals, e.g. 150 to 750 mm, the trays extending over substantially the full cross-section of the column. Each of the trays (2) is provided with a plurality of apertures (3) forming gas flow passages. These apertures (3) are uniformly distributed over the relevant tray and are, in the example shown in the drawings, of circular cross-section. The apertures (3) are further of substantially uniform size throughout, and are spaced apart from each other to provide an aggregate area, that is, the free area of the trays, appropriate to the loading conditions at which the column is to be operated. The portions of the trays (2) containing the apertures (3) for the passage of gas constitute the active areas of the trays (2), i.e., above these areas liquid and gas introduced into the column are intensively mixed with each other for the exchange of matter or heat between the two phases.

Adjoining the active tray areas, there is on each tray (2) a plurality of means for downward flow or transfer of liquid (4), hereinafter called downcomer ducts, which extend through the tray to a predetermined height above the upper surface of the tray (2). The downcomer ducts (4) are open at their upper ends, whereas their lower ends are formed by bottoms (5) provided with a plurality of liquid discharge openings (6). The downcomer ducts (4) are provided with inclined side walls (7), each pair of side walls (7) being so arranged that the downcomer ducts have a configuration resembling in cross-section a frustum. The liquid discharge means or openings (6) are distributed over the bottoms (5) of the downcomer ducts (4) so as to discharge liquid substantially uniformly over the length of the downcomer ducts. The aggregate area of the liquid discharge openings (6) in each downcomer duct (4) should be sufficient for discharging all the liquid which flows down the column at the intended liquid loading, and should be restricted in relation to the horizontal cross-sectional area of the lower part of the downcomer duct so as to maintain in the downcomer duct a column of liquid which exerts at the liquid discharge openings (6) a hydrostatic head which is sufficient to prevent gas from entering the downcomer duct (4).

Figure 2:
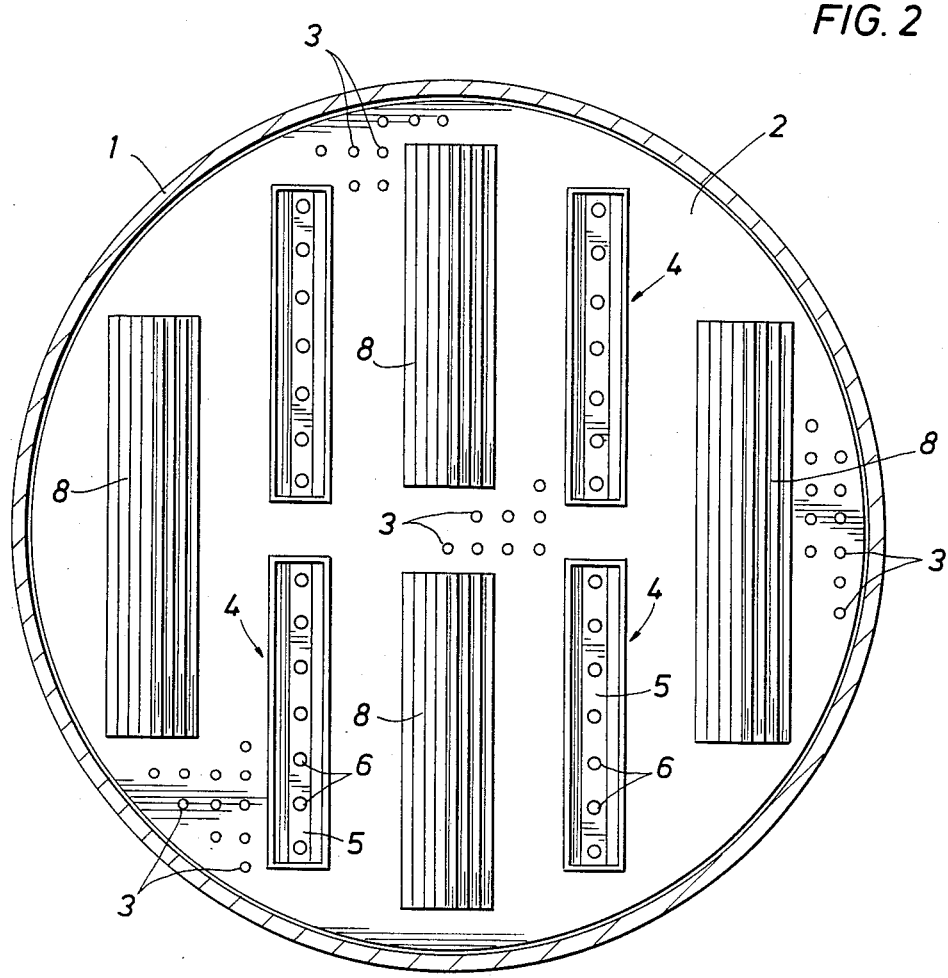
FIG. 2 is a transverse section of the intermediate portion only, taken at the line II—II in FIG. 1.

The interior of the column partly shown in FIG. 1 is further provided with a plurality of perforated structures (8) for distributing liquid from the downcomer ducts (4) over the active tray areas. No distributing means are provided below the bottom tray. The perforated structures (8), mounted on top of a tray, each extend under the full length of a downcomer duct, as shown in FIG. 2. The perforated structures (8) are formed of sheet metal, cut and stretched into a lattice, also called expanded metal. The expanded metal has tangential diamond-shaped openings (9) for the passage of liquid and gas, the area of said openings (9) being adapted to the required liquid and gas loads in the column. Due to the method of producing expanded metal, a sheet of expanded metal is provided with a more open side and a more closed side. The difference between the more open side and the more closed side of a sheet of expanded metal is determined by the size and the number of the openings in the sheet. An increase in the number of openings and/or a decrease of the size thereof causes a more pronounced difference between the more open side and the more closed side of the sheet of expanded metal. The perforated structures (8) each have two side walls (10) and two top walls (11), the top walls being inclined with respect to the horizontal. The top walls (11), formed of expanded metal, are further so arranged that the more closed sides form the upper sides of the top walls and the more open sides form the lower sides of the top walls. The top of the perforated structure (8) is preferably arranged directly below the center of the downcomer duct arranged above structure (8). The inclination of the top walls (11) is determined with the aid of the knowledge of the amounts of liquid and gas which should be passed through the openings in said top walls (11).

With a given configuration of the expanded metal, or in other words, a given difference between the more open and the more closed side of the expanded metal, forming the top walls (11), a decrease of the inclination of the top walls (11) with respect to the horizontal causes an increase of liquid from the above arranged downcomer duct passing through the openings in the top walls (11). The perforated structure (8) may be formed of a single sheet of expanded metal bent into the desired configuration, or may be composed of a plurality of sheets secured to each other. The attachment of the perforated structures (8) onto the trays (2) may be accomplished by welding or bolting.

In operation, liquid from the liquid discharge openings (6) of a downcomer duct (4) is prevented from passing directly through the apertures (3) of the tray below the downcomer duct (4) by the upward flow of gas in combination with the presence of the perforated structure (8) between the downcomer duct (4) and the tray (2). When the gas load is decreased below a certain value, the gas pressure drop over the tray becomes insufficient to prevent liquid from passing directly down through the apertures in the relevant tray. This means that if a perforated structure is not provided between a downcomer duct and a tray, most of the liquid from a downcomer duct will pass through the apertures directly below the downcomer duct, without being intensively mixed with gas. The presence of the perforated structures (8) causes liquid streams from the downcomer ducts (4) to be broken so that the liquid flows partly through the openings in the perforated structures (8), and partly along the perforated structure (8) outwardly away from the downcomer ducts (4). Further, the flow velocity of the liquid streams is considerably reduced when contacting the perforated structures (8). As a consequence thereof, the impact of the liquid on the trays is reduced so that the risk of liquid passing through the apertures of the trays (2) is considerably diminished, compared with the situation in which no perforated structures are arranged in the column. The size and total area of the perforations in the perforated structures and/or inclination of the top walls of these structures are suitably so chosen that liquid from a downcomer duct is adequately distributed over the space outside the relevant perforated structure and the space enclosed by the perforated structure and the accompanying tray. In this manner, the apertures in the trays can be equally loaded and can be equally available for the gas passing through said apertures in upward direction.

By the arrangement of the perforated structures, liquid from the downcomer ducts on a tray is intensively mixed with gas on a next lower tray over the full area of the active part of said next lower tray. Above each tray an intense foam of liquid and gas is formed, enabling the exchange of matter and/or heat between the liquid phase and the gas phase, wherein the actual result of the liquid/gas contact depends upon the characteristics of the gas and the liquid. The liquid subsequently enters the downcomer ducts of a relevant tray partly by overflow from the tray and partly by falling directly into them from the foam in the space above said tray. A column of liquid is formed in each downcomer duct, the column providing a hydrostatic head such that the ascending gas is prevented from entering the downcomer duct through its liquid discharge openings.

It should be noted that the invention is not restricted to the shape of downcomer ducts and liquid discharge openings as shown in the drawing. Instead of the configurations illustrated, the downcomer ducts may have, for example, a circular or annular cross-section. The liquid discharge openings may, for example, be formed by slits extending over substantially the full length of the downcomer ducts.

Figure 3:
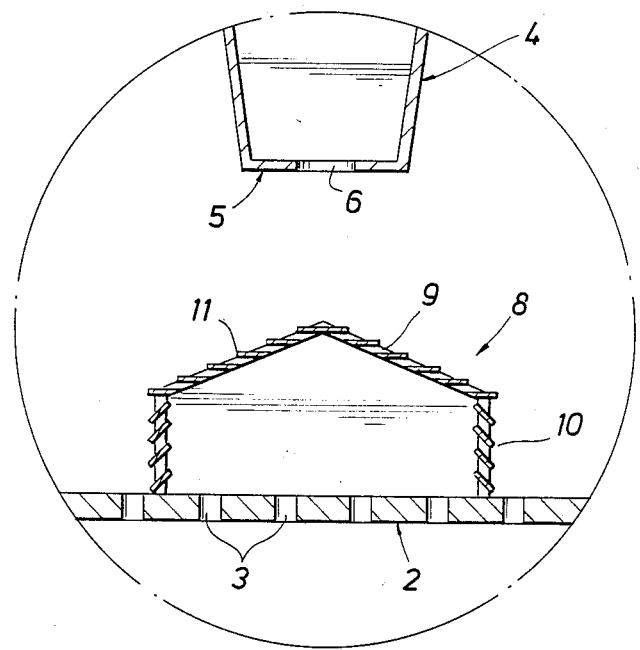
FIG. 3 is an enlarged view of detail III in FIG. 1.

Further, the invention is not restricted to a particular shape of the perforated structures. Although the application of a bent top part, as shown in FIG. 1, is preferred, it is also possible to apply perforated structures having a flat horizontal top wall. In the example shown in the drawing, the perforated structures are secured to the trays on top thereof. It is also possible to attach the perforated structures to the downcomer ducts. It should be noted that the top walls of perforated structures so attached should be arranged at some distance below the bottoms of the downcomer ducts, in order to avoid hindrance of liquid outflow by the presence of said structures. Further, the inclined straight top walls (11), as shown in FIG. 3, may be replaced by a single curved top wall for each downcomer duct.

Although a column provided with sieve trays has been described in the above, perforated structures may also advantageously be applied in columns provided with other types of trays, such as valve trays and grid trays. The presence of perforated structures between downcomer ducts and valve trays prevents the valves directly below the downcomer ducts from being pushed downwards on the trays and closing the accompanying openings in the trays for the passage of gas.

Finally, the present invention is not restricted to the application of expanded metal for forming the perforated structures. Instead, the perforated structures may be, for example, formed by mounting ribs at an angle on to an open framework. It is also possible to apply perforated plates for forming the perforated structure. In this case, the top wall of the structure so formed should preferably be bent or curved to obtain a deflection of the liquid streams leaving the downcomer ducts.

What is claimed is:

1. An apparatus for contacting a liquid with a gas comprising a normally vertically extending column having at least one inlet and outlet, said column having a plurality of internal substantially horizontal trays spaced from each other and arranged in the column one above the other, each of the trays being provided with apertures for the passage of gas and with at least one means for downward transfer of liquid, said means for downward transfer of liquid providing liquid flow from the upper side of a tray to a point below the tray, the means for downward transfer of liquid comprising means for discharge of liquid; and means for distributing the flow of liquid from at least the majority of said means for discharge of liquid over the respective trays beneath said means for discharge, said means for distributing the flow of liquid being separate from the means for downward flow of liquid and positioned beneath the respective means for discharge, but spaced above the tray beneath said means for discharge, each said means for distributing the flow of liquid comprising a perforated structure having a plurality of apertures positioned over the greater portion thereof, the perforated structure being substantially co-extensive with the means for discharge of liquid.

2. The apparatus of claim 1 wherein the perforated structure extends the full length of the means for downward transfer of liquid.

3. The apparatus of claim 2 wherein the means for distributing the flow of liquid are mounted, respectively, on the tops of the respective trays.

* * * * *